Patented Jan. 16, 1923.

1,442,089

UNITED STATES PATENT OFFICE.

PETER OOSTERHOUSE, OF RICHMOND, MICHIGAN.

CHEMICAL FIREPROOF PAINT.

No Drawing.  Application filed October 24, 1921. Serial No. 510,044.

*To all whom it may concern:*

Be it known that I, PETER OOSTERHOUSE, a citizen of Holland, but having taken out my first papers to become a citizen of the United States of America, now residing in Richmond, State of Michigan, have invented certain new and useful Improvements in a Chemical Fireproof Paint, of which the following is a specification.

My invention relates to a composition of chemical ingredients which are mixed in a dry powdered form and made ready for use as a liquid paint by mixing the powdered composition with a sufficient amount of water to bring the solution to a consistency of ordinary paint, and thin enough to be spread on the surface of a building with a brush in the ordinary manner. The paint is especially adapted to fireproofing wooden structures of any kind, or any combustible material, and it also may be used for painting brick, stucco or other surfaces as well.

The object of my invention is to provide a chemical fireproof paint that can be compounded in a powdered form, yet will not combine under a chemical action or solidify and become hardened when all of the ingredients are mixed together and allowed to stand. Great success in forming this paint composition is due to the use of the powdered chlorid of magnesium. Heretofore, the powdered chlorid of magnesium has not been used in this form for this purpose, and the ingredients of the paints on the market at the present time are required to be compounded in separate packages, separating certain ingredients, to avoid chemical action and hardening of the compound, which requires the contents of the several packages to be mixed at the time of using.

Another object of my fireproof paint, is to form a liquid that will penetrate the fibers of wood surfaces and make same absolutely inflammable, and yet have the waterproof qualities to preserve the wood, also, when applied to concrete, brick, stucco or similar surfaces, it will seal the pores, preventing any penetration of moisture or deterioration of the material fibers.

A further object of my invention is to compound a paint that has the fireproof qualities and can be manufactured at a low cost.

My chemical composition consists of a mixture of calcined magnesite, powdered chlorid of magnesium, silex, asbestos fiber and mineral color. The powdered composition is pulverized and thoroughly mixed together. Heretofore the powdered form of chlorid of magnesium has not been used in compositions of this kind, but by its use the inventor has secured results that have not been attained heretofore in the ordinary process, and all of the ingredients may be mixed together.

In preparing the composition I prefer to use the ingredients in about the following proportions: viz, calcined magnesite five parts, powdered chlorid of magnesium five parts, silex ten parts, asbestos fiber one part, mineral color one part, each ingredient is pulverized and thoroughly mixed together by any mechanical means, or other means, and the powdered composition is packed in air tight drums for shipment, or storage until it is desired for use as paint.

To prepare the paint for use, a quantity of the powdered composition is mixed with water in a suitable vessel and thoroughly stirred until the resulting liquid is of the consistency of about the ordinary paint and thin enough to be applied easily to surfaces with a paint brush.

It is to be understood that while I have stated the preferred proportions of the several ingredients of my chemical fireproof paint, it is obvious that my invention is capable of various modifications in amounts used of the various ingredients, without departing from the spirit of my invention, and a variation of from ten to twenty per cent of the amounts of the ingredients may be allowed, but the highest efficiency of the paint for fireproofing is obtained by the above mentioned proportions.

The inventor lays great stress on the use of the powdered chloride of magnesium in forming an important part of the mixture and the high efficiency of the paint.

Having fully described my chemical fireproof paint, what I claim and desire to secure by Letters Patent is:

1. A chemical fireproof paint composition for rendering combustible substances fireproof consisting of five parts calcined magnesite, five parts powdered chlorid of magnesium, ten parts silex, one part asbestos fiber, one part mineral color, pulverized and mixed in a powdered form.

2. A chemical fireproof paint for rendering combustible substances fireproof, consisting of five parts calcined magnesite, five parts powdered chlorid magnesium, ten parts silex, one part asbestos fiber, one part mineral color, pulverized and mixed with water or any suitable fluid, to bring it to a consistency as may be desired for paint or any purpose for which it may be used.

3. A chemical fireproof paint composition for rendering combustible substances fireproof, consisting of from four to six parts calcined magnesite, from four to six parts powdered chlorid of magnesium, from eight to twelve parts silex, from one half to two parts of asbestos fiber, and from one half to two parts mineral color, pulverized and mixed in a powdered form and mixed with water, or any suitable liquid, when desired to use as paint or a fireproof solution.

4. A chemical fireproof paint composition for rendering any combustible substance fireproof, comprising five parts calcined magnesite, five parts powdered chlorid of magnesium, ten parts silex, pulverized and mixed together in a powdered form and mixed with water or any suitable liquid, to a consistency desired when used.

5. A chemical fire proof paint for rendering combustible substances fireproof, comprising from four to six parts calcined magnesite, from four to six parts of powdered chlorid magnesium, from eight to ten parts silex, pulverized and mixed in a powdered form and mixed with water or any suitable liquid when used.

In witness whereof I sign these specifications.

PETER OOSTERHOUSE.